United States Patent
Husain et al.

(10) Patent No.: US 10,897,684 B2
(45) Date of Patent: Jan. 19, 2021

(54) PROVIDING EVENT UPDATES BASED ON PARTICIPANT LOCATION

(71) Applicant: Avaya Inc., Santa Clara, CA (US)

(72) Inventors: Huzefa Husain, Pune (IN); Bimalesh Kumar Singh, Pune (IN)

(73) Assignee: Avaya Inc., Durham, NC (US)

( * ) Notice: Subject to any disclaimer, the term of this patent is extended or adjusted under 35 U.S.C. 154(b) by 0 days.

(21) Appl. No.: 16/216,582

(22) Filed: Dec. 11, 2018

(65) Prior Publication Data

US 2020/0186958 A1    Jun. 11, 2020

(51) Int. Cl.
*H04W 24/00* (2009.01)
*H04W 4/021* (2018.01)

(52) U.S. Cl.
CPC .................. *H04W 4/021* (2013.01)

(58) Field of Classification Search
None
See application file for complete search history.

(56) References Cited

U.S. PATENT DOCUMENTS

| 9,106,710 B1* | 8/2015 | Feimster | H04L 67/22 |
| 2013/0194073 A1* | 8/2013 | Ramaswamy | H04W 4/021 340/8.1 |
| 2016/0086605 A1* | 3/2016 | Kim | H04M 3/56 348/14.03 |
| 2016/0205154 A1* | 7/2016 | Huang | G06F 16/9558 709/204 |

* cited by examiner

Primary Examiner — Suhail Khan
(74) Attorney, Agent, or Firm — IP Spring

(57) ABSTRACT

Methods, systems and computer readable media for delivery of event updates are described. Registration information of an event participant for an event is received, the registration information including participant identity information, the event being associated with a physical event location. Subsequently, during the event, a participant device location from a participant device of the event participant is received and compared with the physical event location. Based on the comparison of the participant device location and the physical event location, an event update associated with the event is transmitted to the participant device.

19 Claims, 7 Drawing Sheets

PROVIDING EVENT UPDATES BASED ON PARTICIPANT LOCATION

TECHNICAL FIELD

Embodiments relate generally to computer networks, and more particularly, to methods, systems, and computer readable media for providing location-based event updates.

BACKGROUND

During live events, such as seminars, conferences, conventions, symposiums etc., there are many instances where an event participant that has registered for the event, arrives late at the event, leaves from the event early, or, in some scenarios, is unable to attend the event. Additionally, in some instances, events includes multiple sessions, and an event participant who is attending the event may be interested in other sessions of the event that take place concurrently.

Some current solutions for the above-mentioned problems are to broadcast live coverage of the event, or to record the event, and send the recording of the event post-completion, to event participants that were not physically present at the event or sessions of the event.

Embodiments were conceived in light of the above-mentioned needs, problems and/or limitations.

SUMMARY

In general, some implementations can provide a computer-implemented method comprising receiving, by a server, registration information of an event participant for an event, the registration information including participant identity information, and the event being associated with a physical event location. The registration information can include one or more topics of interest of the event participant. The method can further include receiving, by the server during the event, a participant device location from a participant device of the event participant comparing, by the server, the participant device location and the physical event location, and transmitting, by the server, based on the comparison, an event update associated with the event to the participant device.

The method can also include establishing, by the server, a media channel between the participant device and the server via a wireless network, prior to transmitting the event update.

In some implementations, comparing the participant device location and the physical event location can include determining whether the participant device is distant from the physical event location, and transmitting the event update to the participant device can include transmitting the event update in response to determining that the participant device is distant from the physical event location.

In some implementations, the physical event location can include a plurality of sub-event locations that correspond to a plurality of sub-events within the event, comparing the participant device location and the physical event location can include determining that the participant device is at a first sub-event location of the plurality of sub-event locations, and transmitting the event update associated with the event to the participant device can include transmitting an event update that corresponds to a sub-event that is occurring at a second sub-event location while the participant device is at the first sub-event location.

In some implementations, comparing the participant device location and the physical event location may comprise establishing a geo-fence based on the physical event location, determining, based on the participant device location, whether the participant device is inside the geo-fence, and in response to determining that the participant device is outside the geo-fence, determining that the participant device is distant from the physical event location.

The method can also include receiving, by the server, during the event and subsequent to receiving the participant device location, an updated participant device location from the participant device of the event participant, determining, by the server, that the participant device is at the physical event location based on a comparison of the updated participant device location and physical event location, and in response to determining that the participant device is at the physical event location, ceasing transmission of the event update associated with the event to the participant device.

The method can also include receiving, by the server, during the event and subsequent to receiving the updated participant device location, a second updated participant device location from the participant device of the event participant, determining, by the server, that the participant device is distant from the physical event location based on a comparison of the second updated participant device location and the physical event location, and in response to determining that the participant device is distant from the physical event location, re-initiating, by the server, transmission of the event update associated with the event to the participant device.

The method can also include identifying, by the server, media associated with the event, the media including one or more of: event video, event audio, and event text, analyzing, by the server, the media associated with the event, to determine a current topic of the event, determining, by the server, whether the current topic matches at least one of the one or more topics of interest of the event participant, and in response to determining that the current topic matches the at least one of the one or more topics of interest of the event participant, generating, by the server, the event update that includes the media associated with the event.

In some implementations, generating the event update can include generating a summary of the media associated with the event, the summary including a computer-generated text summary of one or more of: the event video, the event audio, and the event text. In some implementations, generating the summary of the media associated with the event can include generating a transcript of the event audio by applying speech recognition. The event update associated with the event can include the transcript of the event audio.

Some implementations can include a system comprising a microprocessor, and a computer readable storage media coupled with the microprocessor and comprising microprocessor readable and executable instructions that cause the microprocessor to perform operations. The operations can include receiving registration information of an event participant for an event, the registration information including participant identity information, and the event being associated with a physical event location. The operations can further include receiving, during the event, a participant device location from a participant device of the event participant, comparing the participant device location and the physical event location, and transmitting, based on the comparison, an event update associated with the event to the participant device.

In some implementations transmitting the event update associated with the event can include transmitting, to the participant device, one or more text messages, one or more instant chat messages, one or more social media messages, or one or more messages in an event application installed on the participant device, or combinations thereof.

In some implementations, the operation of comparing the participant device location and the physical event location can include determining whether the participant device is distant from the physical event location, and the operation of transmitting the event update to the participant device can include transmitting the event update in response to determining that the participant device is distant from the physical event location.

In some implementations, the physical event location can include a plurality of sub-event locations that correspond to a plurality of sub-events within the event, the registration information can include information about at least one sub-event, of the plurality of sub-events, which is of interest to the event participant, comparing the participant device location and the physical event location can include determining that the participant device is distant from a sub-event location that corresponds to the at least one sub-event, and transmitting the event update associated with the event can include transmitting an event update associated with the at least one sub-event to the participant device in response to determining that the participant device is distant from the sub-event location.

In some implementations the at least one sub-event can be a first sub-event, and the at least one sub-event location can be a first sub-event location. The operations can also include receiving, during the event and subsequent to receiving the participant device location, an updated participant device location from the participant device of the event participant, determining that the participant device is at the first sub-event location based on a comparison of the updated participant device location and the first sub-event location, and in response to determining that the participant device is at the first sub-event location, ceasing transmission of the event update associated with the first sub-event to the participant device.

The operations can further include determining, based on the registration information, that the event participant is also interested in a second sub-event that is occurring at a second sub-event location while the participant device is at the first sub-event location, and in response to determining that the event participant is interested in the second sub-event that is occurring at the second sub-event location while the participant device is at the first sub-event location, transmitting an event update associated with the second sub-event to the participant device.

Some implementations can include a participant device that comprises a microprocessor, and a computer readable storage media coupled with the microprocessor and comprising microprocessor readable and executable instructions that cause the microprocessor to perform operations. The operations include transmitting, to a server, registration information of an event participant for an event, wherein the registration information includes participant identity information, and wherein the event is associated with a physical event location. The operations further include transmitting, to the server, during the event, a participant device location, and receiving, from the server, based on the participant device location, an event update associated with the event.

In some implementations, the event update is received at the participant device in response to: comparison of the participant device location and the physical event location, and determination, based on the comparison, that the participant device location is distant from the physical event location.

In some implementations, receiving the event update comprises receiving one or more text messages, one or more instant chat messages, one or more social media messages, or one or more messages in an event application installed on the participant device, or combinations thereof.

In some implementations receiving the event update comprises receiving a summary of media associated with the event, and wherein the summary includes a computer-generated text summary of one or more of an event video, an event audio, and an event text.

DETAILED DESCRIPTION

A technical problem in event management for live events is keeping event participants who may not be present at the event location apprised of event proceedings.

In accordance with the present disclosure, event participants that have registered for an event but are unable to attend the event, physically or virtually, or aren't close to the event, are provided event updates. In some implementations, the event updates are live updates, e.g., provided while the event is in progress. Additionally, event participants are enabled to indicate one or more topics of interest, corresponding to the event, for which the event participants would like to receive event updates. When such indications of the topics of interest are provided, the event updates correspond to the one or more topics of interest of the event participants. In some implementations, a location of a participant device (corresponding to an event participant) and a physical event location is compared to determine if the event participant is present at the event location. Based on the determination that the event participant is not present at the event location (e.g., the location of the participant device is distant from the physical event location), event updates are provided to the event participant (e.g., the event updates are transmitted to the participant device). In some implementations, during the event, the location of the event participant may be determined. The location determination may utilize location tracking of the participant device with user consent and permission, based on which the transmission of the event updates is initiated and ceased.

In some implementations, the event participant who is physically present at a sub-event location, which corresponds to a sub-event of the event, is provided event updates corresponding to another sub-event which is also of interest to the event participant.

In some implementations, the event updates are transmitted to the participant device in the form of text messages, chat messages, social media messages, event application messages, or combinations thereof.

Figure 1:
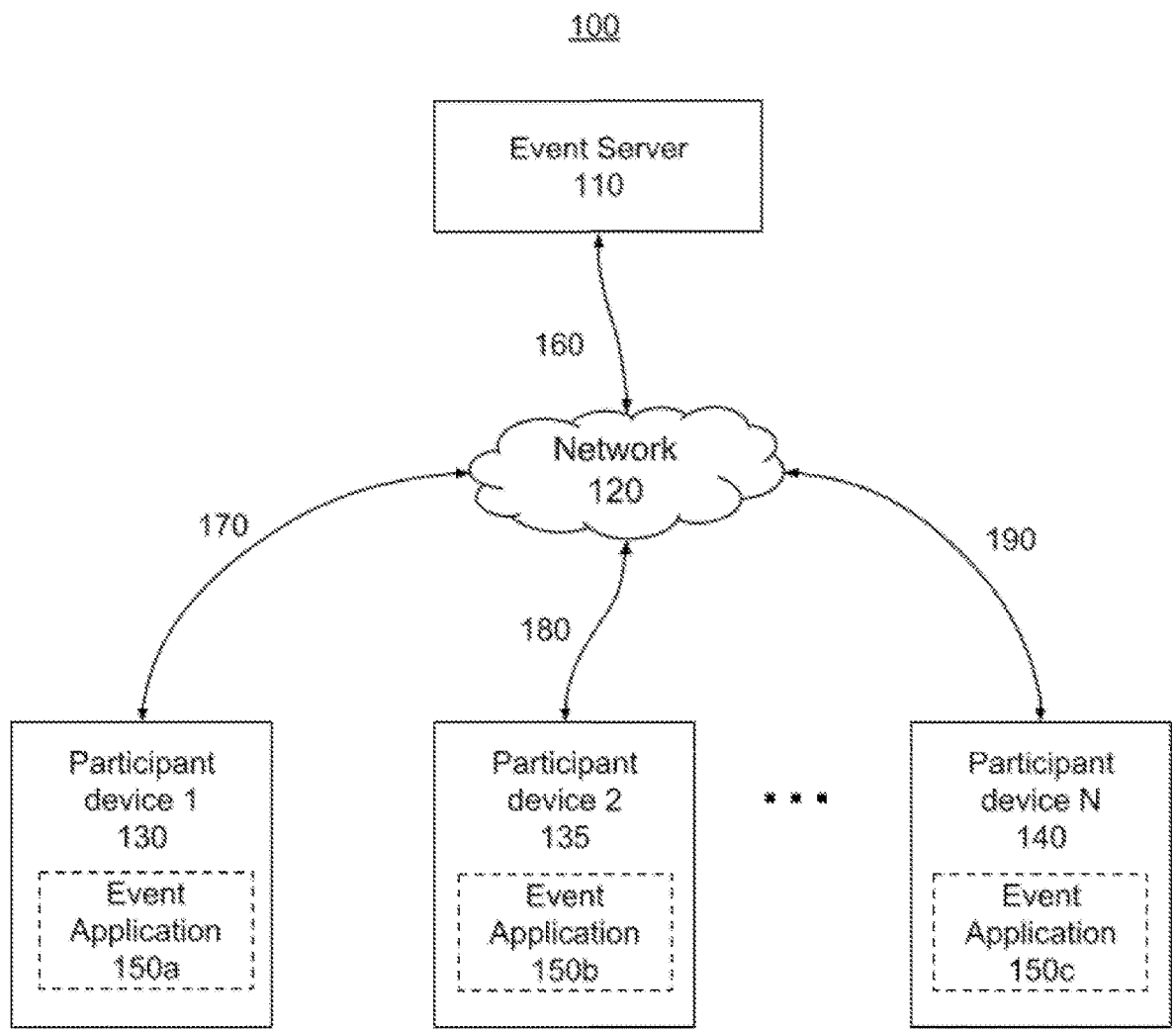
FIG. 1 is a diagram of an example network environment in which a session for event updates may be conducted, in accordance with some implementations.

FIG. 1 is a diagram of an example network environment 100 in which event updates may be provided, in accordance with some implementations. An event server 110 is configured in communication with a network 120 via a signal line 160. Event server 110 may be a computer, e.g., a server computer, a dedicated event host device that manages and controls event activities, or any other type of device that connects and communicates with multiple event participant devices to exchange event related information, e.g., event registration, event updates, device location of participant devices, interest information corresponding to interest of the event participants in event topics, etc.

In some implementations, the event server 110 performs management and control of live events, e.g., seminars, conferences, conventions, summits, symposiums etc. or any other registration-based event. Participant devices 130 (Participant device 1), 135 (Participant device 2), and Participant device N 140 are configured in communication with network 120 via signal lines 170, 180, and 190 respectively. While FIG. 1 shows three participant devices, any number of participant devices may be included in the environment. A participant device can be any type of electronic device, e.g., desktop computer, telephone, laptop computer, portable or mobile device, cell phone, smartphone, tablet computer, personal digital assistant (PDA), etc. Participant devices 130, 135, and 140 may be associated with event participants (e.g., users that have registered for the event) or with potential event participants.

The participant devices 130, 135, 140 and the event server 110 may communicate with each other via network 120. In some implementations, participant devices 130, 135, and 140 may communicate among themselves via the network 120. Network 120 can be any type of communication network, including one or more of the Internet, local area networks (LAN), wireless networks, switch or hub connections, a telephone network (e.g., a PSTN network, a cellular network, etc.) etc. In some implementations, network 120 can include peer-to-peer communication between participant devices, e.g., using peer-to-peer wireless protocols (e.g., Bluetooth®, Wi-Fi Direct, etc.), etc.

In some implementations, the participant devices 130, 135, and/or 140 can include one or more applications. For example, as shown in FIG. 1, the participant devices 130, 135, and 140 may include respective event applications 150a, 150b, and 150c. An event application 150 (which may be any of applications 150a, 150b, or 150c) may be a client application that is used by the participant devices to communicate with the event server 110 via the network 120. The event application 150 may be a software application that can be executed on the participant devices 130, 135, and/or 140. In some implementations, the event application 150 may provide a user interface. In some implementations, the event application 150 may use a voice-based interface (voice assistant), or may be configured to operate in conjunction with other voice assistants.

In some implementations, the event application 150 may also be responsible to display text, audio, video, or any media from the event server 110 on a participant device, and to transmit media and/or user input from the participant device to the event server 110 or other participant devices. The media from the event server 110 may include event updates (e.g., live event updates) in accordance with some implementations of the present disclosure. In some implementations, the event application 150 may also determine the location of the event participant, e.g., by accessing location information from an on-board location sensor of a participant device, if permitted by the participant. In some implementations, the event application 150 and/or the event server 110 may obtain the location of the event participant from other device(s) associated with the event participant. The other devices may include wearable devices such as smart glasses, smart watch etc. The wearable devices (such as smart glasses, smart watch etc.) may authenticate and/or provide location information of the event participant to the event application 150 (via the participant device on which the event application 150 may be installed) or directly to the event server 110. In some implementations, the event application 150 and/or the event server 110 may obtain location information of the event participant from other applications installed on the participant device, such as a cab/taxi provider application, or a ride sharing application that may be used by the event participant to get a cab or a ride to reach the location of the event. Such applications may track the location of the event participant (participant device) until the event participant reaches the intended destination and may provide tracked location of the event participant to the event application 150 and/or the event server 110.

In some implementations, the event application 150 may enable a user (e.g., event participant) of the participant device to communicate with the event server 110 for event related activities, e.g., receive event details such as speaker names, session information including session topics, event program, event schedule, event calendar etc., and also register for the event, pay registration fees, etc. In some implementations, while registering for the event through the event application 150, the event participant may indicate specific topics of interest. The event application 150 may provide a user interface on the participant device for the event participant to indicate one or more topics of interest to the event participant. In some implementations, while the event is in progress, the event participant may indicate to the event server 110 via the user interface presented by the event application 150 that the event participant would like to receive event updates about a particular activity, topic, session, or speaker of the event. The interests of the event participant may also be determined from social networking sites. The interests of the event participant may correspond to topics presented or discussed at the event, activities at the event, sessions of the event, and/or speakers at the event etc. In some implementations, the event application 150 may receive an indication from the event participant that they want to attend the event virtually (e.g., the event participant may determine that they are not going to be able to reach the location of the event and may provide indication to the event server 110 via the event application 150 that the event participant is going to attend the event virtually). In these implementations, the event updates are provided to the event participant regardless of the location of the event participant such that the event participant is able to attend the event virtually (passive mode).

For example, the event may be a conference about "cloud computing" in which various types of "cloud computing solutions" (e.g., "infrastructure as a service", "platform as a service, software as a service", "recovery as a service" etc.) are to be presented by various speakers to event participants.

For instance, "Speaker A" may be scheduled to present "infrastructure as a service" and "platform as a service", "Speaker B" scheduled to present "software as a service", and "Speaker C" scheduled to present "recovery as a service." The user of the participant device 130 may indicate to the event server 110, via the event application 150, that the user is interested in topics "infrastructure as a service" and "recovery as a service". In some instances, the user of the participant device 130 may indicate to the event server 110, via the event application 150, that the user is interested in attending presentations or sessions by particular speakers A and C. The event server 110 may store such information as interests of the event participant.

In some implementations, the event application 150 may request access to services, e.g., location access, speaker access, microphone access etc. provided on a participant device. In some implementations, the event application 150 may request access to location information of the participant device for a particular duration of time, e.g., from a few hours prior to a scheduled commencement of the event to a scheduled end time of the event. Upon receiving access from the user, the event application 150 may determine the location of the participant device based upon the provided location information and may transmit location information of the participant device to the event server 110. Such determination may be made continuously, or periodically (e.g., once a minute, once every 5 minutes, once an hour, etc.)

In some implementations, the participant devices 130, 135, and/or 140 may not include event application 150. In these implementations, the participant devices 130, 135, and/or 140 may communicate with the event server 110 via other mechanisms such as an event website, a chat ID associated with the event, etc.

Figure 2:
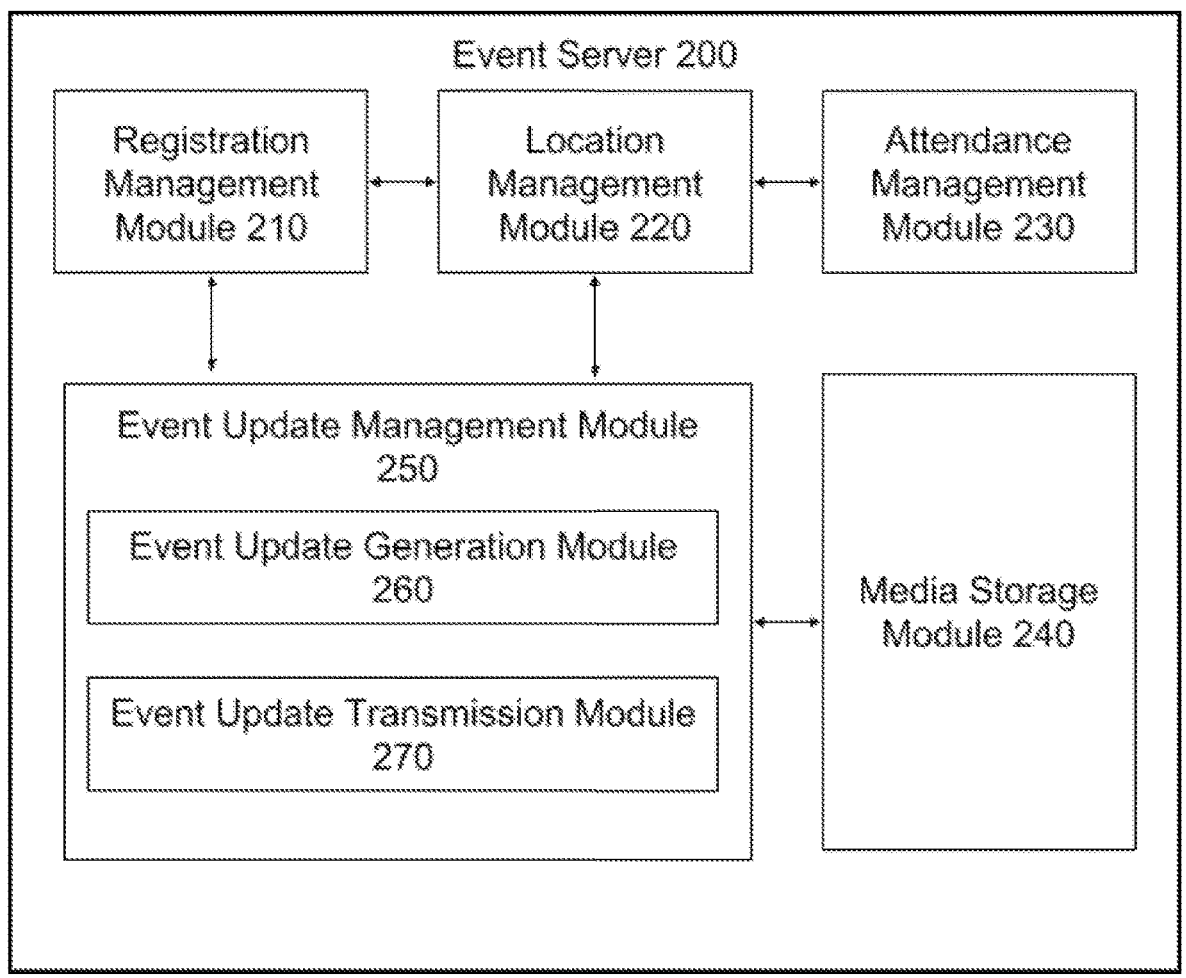
FIG. 2 is an example illustration of an event server in accordance with some implementations.

FIG. 2 is an example illustration of an event server 200 in accordance with some implementations. The event server 200 may perform control and management of media associated with an event that takes place at a physical event location e.g., convention center, exhibition hall, auditorium stadium, arena, gallery, hotel, school, college, university, etc. In some implementations, the event managed and controlled by the event server 200 may include a virtual event, e.g., a virtual meeting, a webinar, etc. that is hosted online. In these implementations, the physical event location associated with the event may include a location selected by an event participant. The selected location may include a location from where the event participant intends to attend the virtual event. For example, the selected location may correspond to an event participant's home location or office location, where a workstation of the event participant or audio/video conferencing equipment may be present. The selected location may include a location within the event participant's home (e.g., a home office), or a location within the event participant's office (e.g., a meeting room.) etc. The event may be associated with multiple physical event locations, e.g., locations selected by different event participants.

In some implementations, the event participant may wish to receive event updates regardless of the location of the event participant. For example, when the event is a virtual event, the event participant may provide indication to the event server 200 (e.g., via the event application 150) that they would like to receive event updates regardless of whether the event participant is at the selected location (a location from where the event participant intends to attend the virtual event) or not. The event participant may provide such indication while registering for the event.

The event server 200 may be a computer, e.g., a server computer, a dedicated event host device that manages and controls event activities, or any other type of computing device that is configured to control and manage event updates for event participants of an event in accordance with some implementations of the present disclosure.

The event server 200 includes various modules, e.g., registration management module 210, location management module 220, attendance management module 230, a media storage module 240, and event update management module 250. The event update management module 250 may include event update generation module 260 and event update transmission module 270. The modules provide event update management and control.

In some implementations, the event server 200 may be implemented as a cloud server. In some implementations, one or more modules of the event server 200 may be implemented as one or more components of the cloud server.

The registration management module 210 may facilitate registration of event participants. In some implementations, the registration management module 210 may enable the event participants to register for the event and store the registration information. In some implementations, the registration management module 210 may receive registration information from an event application (e.g., event application 150 described with reference to FIG. 1) installed on the participant devices. In some implementations, the registration information may be received through an event website. The registration information may include user credentials, e.g., participant identifier, name, address, phone number, etc., and topics of interest as indicated by the event participants. As discussed above with reference to FIG. 1, the topics of interest may include keywords or phrases descriptive of one or more topics, one or more sessions of the event, or one or more speakers at the event. In some implementations, the event may include a plurality of sub-events, and the topics of interest may indicate one or more of the sub-events.

In different implementations, an event participant may select one or more topics of interest, e.g., from a menu of available topics, or indicate topics of interest via free-form text entry. In some implementations, e.g., where the event application has access to a participant profile (e.g., a social media profile, an employee profile of an organization to which the event participant belongs, etc.), the topics of interest for the event participant may be automatically selected (or suggested to the participant) based on the participant profile. In some implementations, suggested topics of interest may include topics that were previously selected by the participant (e.g., at a previous event), topics that were selected by other participants, topics that are popular among previously registered participants, etc.

In some implementations, where the event is a virtual event, e.g., an online meeting, a webinar, etc., and the physical event location associated with the event is a particular location selected by an event participant to attend the virtual event, the registration management module 210 may receive indication of the selected location, by the event participant, to attend the virtual event along with the registration information. In such implementations, the registration management module 210 may store the received information as the physical event location for the event participant along with the user credentials of the event participant.

In some implementations, where a registration fee is to be paid for the registration, the registration management module 210 may facilitate presentation of a payment interface to the event participants (e.g., through the event application 150 described with reference to FIG. 1) to enable the event participants to make a payment to confirm registration. The registration management module 210 may include additional features, e.g., enable event participants to modify or cancel their registration, or update topics of interest, invite other event participants, etc.

The registration management module 210 may store registration information, e.g., user credentials of the event participants along with their respective topics of interest and selected physical event location (in case of virtual events) in a storage device (not shown) of the event server 200. The stored information may be accessible to other modules of the event server 200.

In some implementations, a third party registration service may be used for registration of the event participants and to perform other functionalities stated as being performed by the registration management module 210. In these implementations, the registration management module 210 may obtain registration information (e.g., user credentials of the event participants along with their respective topics of interest and selected physical event location (in case of virtual events) of the event participants) from the third party registration service and store the registration information in the storage device (not shown) of the event server 200.

The event server 200 further includes a location management module 220 that determines a location of event participants by communication with respective participant devices, e.g., devices 130, 135, and 140. The location management module 220 may receive (e.g., continuously, or periodically) location information from the participant devices. A participant device may determine its current location using, e.g., GPS (Global Positioning System), Wi-Fi triangulation, cellular telephone triangulation, radio frequency signal strength, etc. In some implementations, as discussed above with reference to FIG. 1, users of the participant devices may provide access to their location to the event server 200 via an event application (e.g., event application 150) installed on the participant devices. The location management module 220 may receive location information of the participant devices at different times, e.g., prior to, during, and upon completion of the event.

In some implementations, the location management module 220 may store location information of the participant devices and may refresh the stored location information upon receipt of updated information from the participant device, such that the event server 200 has up to date location information of the participant devices. In some implementations, the location management module 220 may track the participant devices if permitted by the user, e.g., starting a few minutes, or a few hours before the scheduled commencement of the event until the completion of the event.

In some implementations, the location management module 220 may establish a geo-fence based on a physical location of the event to identify event participants that enter or exit the physical location of the event. In scenarios where the event includes a plurality of sub-events taking place at a plurality of sub-event locations within the event, the location management module 220 may establish a geo-fence around the one or more sub-event locations to track event participants that enter or exit the sub-event locations. Such entry and exit information of the event participants may be used to provide event updates to the event participants.

In some implementations, the location management module 220 may store location information of the event participants in a storage device (not shown) of the event server 200.

The event server 200 may also include attendance management module 230. The attendance management module 230 creates an attendance record of the event participants. In some implementations, the event server 200 may obtain registration information of the event participants (e.g., the registration management module 210), and the location information of the event participants (e.g., with the location management module 220). The attendance management module 230 may use the location information of the participant devices to determine event participants that are present at the event location, and automatically record those event participants as being present at the event. The attendance management module 230 may compare the location of the participant devices and the physical event location to determine the event participants that are present at the physical event location to verify attendance of the event participants. Automatic recording of the attendance of the event participants by the attendance management module 230 eliminates the need for manual recording of the attendance at the location of the event.

In some implementations, when the event includes a plurality of sub-events, the attendance management module 230 may determine attendance of the event participants, from the location information of the participant devices, with respect to one or more of sub-events. For example, the attendance management module 230 may compare the location of the participant devices and a location of a sub-event to determine the event participants that are present at the sub-event location, thus recording attendance of the event participants with respect to the sub-event in an attendance record. The attendance management module 230 may perform multiple comparisons of the participant device location with the event/sub-event location to determine attendance, e.g., at least one comparison that determines whether a participant device is present at the location of the event/sub-event while the event/sub-event is in progress. An event calendar or schedule may be stored on the event server 200, or accessible by the event server 200, and may be accessed by the attendance management module 230 to make such determination.

The attendance management module 230 may also keep record of attendance of the event participants who provide their attendance at the location of the event, e.g., using a user-interactive kiosk provided at the event location which may send user attendance data to the event server 200. In some implementations, the attendance management module 230 may store the attendance record in a storage device (not shown) of the event server 200.

The event server 200 also includes media storage module 240. The media storage module 240 may store and manage media corresponding the event. The media may include audio, video, text, or multimedia corresponding to various activities and sessions associated with the event. For instance, when the event is a technical conference where various speakers present technical topics, the media storage module 240 may store presentation media, e.g., a slide deck, code snippets, audio or video of the speaker and participants at the event location, etc.

In some implementations, the media storage module 240 may receive the event media from another media server, e.g., cloud server. In some implementations, event media from the cloud server may be used for presentations at the event, and the event media is stored at the media storage module 240 post-completion of the event.

The media storage module 240 may also be configured to receive audio and/or video feed from audio and/or video recording devices at the event. For example, the audio feed may correspond to speech delivered by speakers at the event, audio from question and answer sessions, etc. The audio and/or video feed may be stored by the media storage module 240 as the event media. The audio and/or video feed may be received directly from audio/video recording devices at the event or via a communication manager server.

In implementations in which the event includes a plurality of sub-events, the media storage module 240 may store media corresponding to each sub-event separately from rest of the sub-events. For example, the event may be a conference about "cloud computing" in which various types of "cloud computing solutions" (e.g., "infrastructure as a service", "platform as a service", "software as a service", "recovery as a service" etc.) are to be presented by various speakers to event participants. For instance, "Speaker A" is scheduled to present "infrastructure as a service" and "platform as a service", "Speaker B" is scheduled to present "software as a service", and "Speaker C" is scheduled to present "recovery as a service." The media storage module 240 may store event media corresponding to various presentations e.g., the presentation media of "Speaker A", the presentation media of "Speaker B", and the presentation media of "Speaker C" separately. The media storage module 240 may also store the audio feed of all speakers at the conference event separately. In some implementations, event media stored by the media storage module 240 is time-stamped based on a time of occurrence of the sub-event. The event media stored in the media storage module 240 may be indexed by a sub-event identifier.

The event server 200 also includes event update management module 250 that provides event updates (e.g., live event updates) to event participants in accordance with some implementations. The event update management module 250 may include event update generation module 260 and event update transmission module 270 that inter-operate to provide event updates to the event participants.

The event update generation module 260 may obtain information about the current location of the participant devices from the location management module 220 and compare the location the participant devices with the physical event location. In some implementations, where the event is a virtual event and the physical event location associated with the event is a location selected by an event participant to attend the virtual event, the event update generation module 260 may obtain information about the physical event location (for the event participant) from the registration management module 210 and compare the physical event location with the location of the participant device.

Based on the comparison, the event update generation module 260 may determine that event updates are to be transmitted to one or more event participants. In response to a determination that the event updates are to be transmitted, the event update generation module 260 may identify and analyze event media to generate event updates.

In some implementations, the event may include a plurality of sub-events. In such implementations, the event update generation module 260 may compare the location of the participant device with one or more sub-event locations. Subsequently, the event update generation module 260 may determine whether the event participant is distant from the one or more sub-events, e.g., outside a geo-fence determined for the one or more sub-events.

In some implementations, the event update generation module 260, based on a comparison of a location of a participant device (e.g., participant device 130) with the physical event location, determines that the participant device is distant from the physical event location during the event. In response to the determination, the event update generation module 260 may identify and analyze the event media to generate event updates for the participant device. In some implementations, the event update generation module 260 may determine topics of interest of the user of the participant device 130, e.g., obtain information corresponding to the interests from the registration management module 210, and generate the event updates based on the topics of interest of the user of the participant device.

In some implementations, where the event participant has registered to attend the event (e.g., a virtual event) regardless of the location of the event participant, the event update generation module 260 may assume the location of the event participant to be a particular location that is different than the physical event location such that upon comparison, the event participant is always determined to be distant from the physical event location.

In some implementations, the event updates are live event updates e.g., the event updates are generated by the event update generation module 260 simultaneously or substantially simultaneous to occurrence of the event. In some implementations, the live event updates refer to event updates that are provided as the event progresses. For example, when the event is a lecture, presentation, or seminar in which various topics are presented by a presenter with the use of presentation slides, a live event update may be generated as the presenter switches between slides and is transmitted to the event participant. For example, a live event update may be generated and provided as the presenter finishes the presentation of a particular slide and moves on to the next slide.

For example, such switching between slides may be determined by performing audio and video analysis on the event media, e.g., that includes video that comprises the slides, speaker audio, etc. to detect slide transitions. Such analysis may include, for example, performing text analysis of transcribed speech of the speaker to determine when the speaker switches slides (e.g., by detecting phrases such as "next slide," "moving on," etc. and/or by detecting that the speaker has changed subject, e.g., from IaaS to SaaS). In some implementations, analysis of speech may be combined with analysis of a video of the event, e.g., that includes slides being switched on a display screen of the event (e.g., a projector or other video at a physical event, a shared screen in a virtual event, etc.)

In another example, the topic being presented in a lecture, presentation, or seminar includes multiple sub-topics. In such scenarios, the event update generation module 260 may detect transition from presentation of one sub-topic to next sub-topic, and the event update generation module 260 may generate live event updates for each sub-topic. For instance, if the event is a technical conference about "benefits of cloud computing," the event update generation module 260 may classify each "benefit" of "cloud computing" being presented as a sub-topic and generate event updates accordingly, e.g., "Update 1: Cloud computing allows flexible deployment of resources with easy scalability," "Update 2: Cloud computing provides enhanced security," and "Update 3: Cloud computing leverages high bandwidth network connections." Such event updates that are generated (and subsequently transmitted) as and when the presentation of topic or sub-topic is being concluded may be defined as "live event updates."

In some implementations, an event update may be generated (and subsequently transmitted) periodically, e.g., once a minute, once every five minutes, etc. In some implementations, an event update may be provided based on the event media, e.g., upon a slide transition, upon a change in speaker, for each question and a corresponding answer, etc. In some implementations, the event participant may provide their preference for frequency of event updates, e.g., through an event application.

The event update generation module 260 may access event media in the media storage module 240. The event media may include audio, video, text, other media, or a combination thereof. The event update generation module 260 may analyze the event media to determine current topic of the event (e.g., current topic being presented or discussed at the event). In some implementations, the event update generation module 260 may utilize a time-stamp associated with the event media to determine the current topic of the event.

In some implementations, speech to text conversion (voice recognition and transcription software) may be utilized to process audio from the event, and the converted text used to match keywords (and/or synonyms of keywords) specified as interest by the event participant. A current topic may be determined on the basis of keyword matching.

In some implementations, the event audio may be compared to the event participant's interest keywords (and/or synonyms of keywords) that are converted to speech using Speech Synthesis or text-to-speech (TTS) software.

In some implementations, the event update generation module 260 may determine whether the current topic of the event matches a topic of interest of the event participant (e.g., remote event participant). The event update generation module 260 may parse the current topic of the event (e.g., event audio) to determine keywords associated with the current topic, and similarly, parse information corresponding to topics of interest of the event participant to determine keywords associated with the topic of interest of the event participant. The event update generation module 260 may compare the keywords associated with the current topic of the event, and the keywords associated with the topics of interest of the event participant to determine whether the current topic of the event matches with the interest of the event participant. The event update generation module 260 may generate event updates in response to determining that the current topic of the event matches at least one topic of interest of the event participant.

In some implementations, the event update generation module 260 may generate a summary of the media associated with the event, e.g., associated with the current topic of the event. In some implementations, the summary of the event media includes a computer-generated summary of one or more of event audio, event video, event text, or a combination thereof.

In some implementations, the event update generation module 260 may perform speech recognition on the event audio, e.g., speech of a speaker at the event. After performing the speech recognition, the event update generation module 260 may generate a transcript of the event audio, which is then transmitted to the participant device as the event update.

In some implementations, the event update generation module 260 may implement artificial intelligence techniques to determine whether the current topic of the event matches with a topic of interest of the event participant. In such implementations, the event update generation module 260 may parse information corresponding to interest of the event participant to determine keywords associated with the interest of the event participant. The event update generation module 260 may then attempt to detect those keywords or semantic concepts determined based on the keywords in the event media, e.g., audio feed corresponding to a speaker currently speaking at the event, and when the event media corresponding to the keyword is detected, such event media is analyzed to generate event updates, e.g., a computer-generated summary of the audio feed may be generated. In some implementations, the audio feed itself is sent as the one or more event updates to the remote event participant.

In some implementations, the event update generation module 260 may also utilize artificial intelligence techniques to detect that a speaker at the event has raised a query for the event participants. The event update generation module 260 may transmit such query in the form of an event update to the participant devices (e.g., remote participant devices) through the event update transmission module 270 and the event application (e.g., event application 150 described with reference to FIG. 1). For example, a question mark may flash on an app or browser on a participant screen highlighting that the event speaker has raised a query. Such query may be transmitted to the participant devices (e.g., remote participant devices) with an option to reply to the query. The response from the event participant, e.g., from participant devices (e.g., remote participant devices) may be received through the event update transmission module 270 and stored by the event server 200. In some implementations, the response of the event participants may be provided to the speaker that raised the query.

The event update transmission module 270 may transmit the event updates generated by the event update generation module 260 via a media channel that is established between the participant device and the event server 200 prior to transmission of the event updates. The media channel may utilize a TCP/IP protocol. In some implementations, the event update transmission module 270 may transmit the event updates in the form of text messages, e.g., Short Message Service (SMS) messages, chat messages sent via an instant messaging application, messages delivered via an event application, social media messages etc. In some implementations, event updates may include non-text portions, e.g., images from the event.

Figure 3:
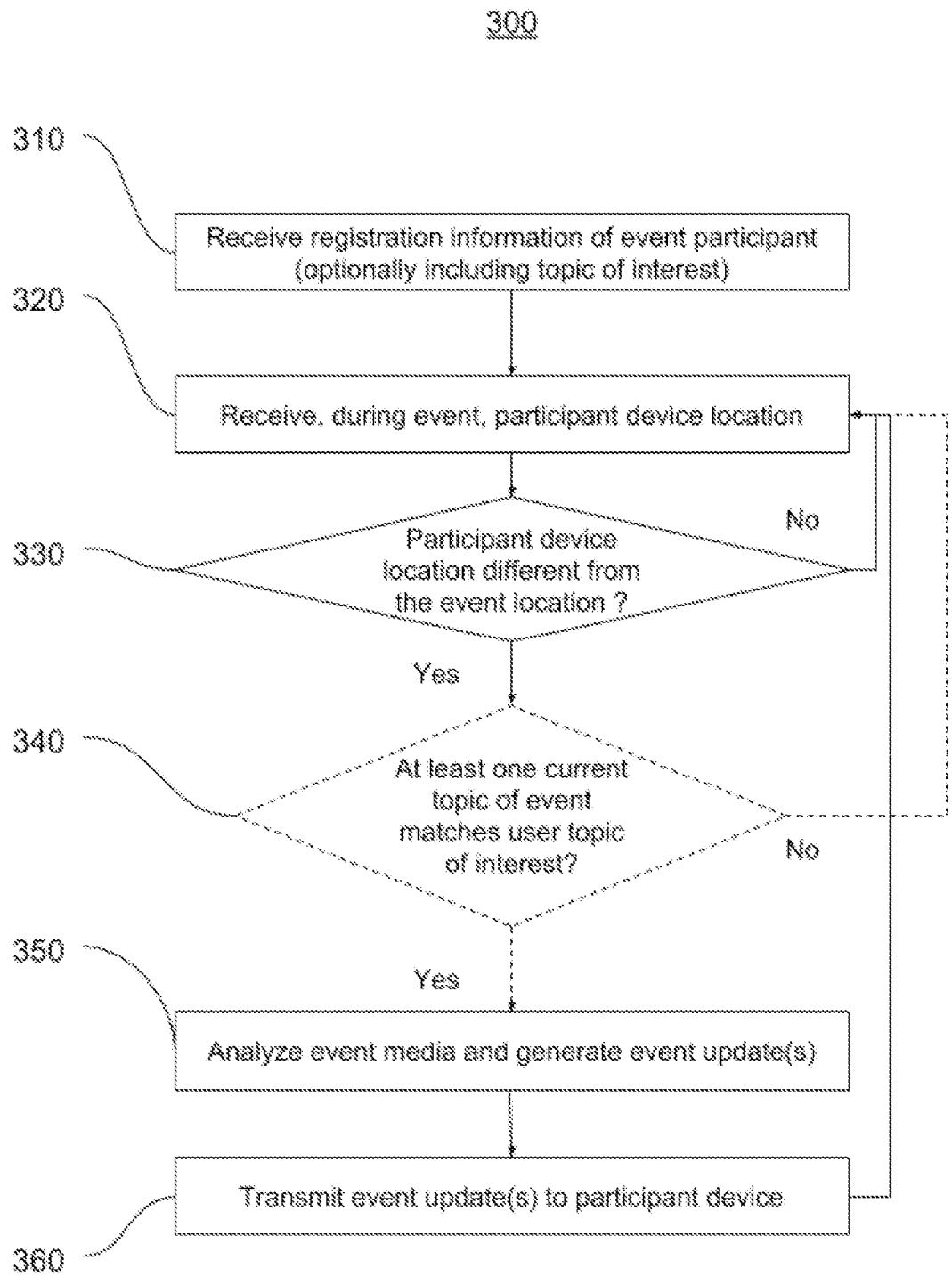
FIG. 3 is a flowchart illustrating an example method for delivery of event updates in accordance with some implementations.

FIG. 3 is a flowchart illustrating an example method for delivery of event updates in accordance with some implementations.

The method 300 begins at block 310, where registration information is received from an event participant, e.g., by an event server such as event server 110 described with reference to FIG. 1 or an event server 200 described with reference to FIG. 2. The registration information is received from a participant device (e.g. a participant device similar to one of participant devices 130, 135, and 140 described with reference to FIG. 1). The registration information may be received via an event application (e.g. similar to an event application 150 described with reference to FIG. 1) installed on the participant device. The registration information may include an identifier associated with the event participant. The registration information may also include one or more topics of interest indicated by the event participant. In some implementations, where the event includes multiple sub-events, the registration information may also include one or more sub-events that are of interest to the event participant. Processing continues to block 320.

At block 320, location information of the participant device is received by the event server from the participant device. The location information may be received using the event application (e.g., event application 150 described with reference to FIG. 1) installed on the participant device. The event participant may enable or permit the event application to access location of the participant device. Processing continues to block 330.

At block 330, the location information of the participant device is compared, by the event server, to the physical location of the event. In some implementations, the location information of the participant device may include GPS coordinates indicative of the location of the participant device, and the physical location of the event may include GPS coordinates indicative of the location of the event. In some implementations, the GPS coordinates are compared to determine whether the participant device is distant from the physical location of the event. In some implementations, the comparison of the participant device location and the physical event location may include establishment of a geo-fence based on the physical event location and determination of whether the participant device is inside or outside the geo-fence (based on the participant device location).

For example, a geo-fence may be established as a range of values of GPS coordinates that correspond to the event location (e.g., a stadium, or other location) and a participant device may be determined as present at the event location if the GPS coordinates of the participant device are within the range. In some implementations, the geo-fence may be established by use of physical beacons, e.g., wireless transmitters placed at the event location. In these implementations, the participant device may be determined as present at the event location if the participant device indicates that it has received information transmitted by one or more of the physical beacons. In some implementations, geo-fences may be implemented using a combination of physical beacons and GPS techniques.

If it is determined that the participant location is different from the event location, e.g., that the participant device is outside the geo-fence, processing continues to block 340. Else, processing continues to block 320.

At block 340, a current topic of the event is compared against the topics of interest of the event participant to determine whether the current topic of the event matches with at least one topic of interest of the event participant. In some implementations, e.g., when a participant has not provided information regarding topics of interest, block 340 is not performed and instead, event updates are sent to the participant device, e.g., default event updates regarding the event. In response to determining that the current topic of the event matches a topic of interest of the event participant, or that default updates are to be provided, the method continues to block 350. Else, the method continues to block 320.

At block 350, the event media is analyzed, by the event server, to generate event updates. In some implementations, the event media may include event text, event audio, event audio, or combinations thereof. The event media may correspond to audio feed from event location, video feed from the event location, or multimedia files presented by various presenters or speakers during the event. In some implementations, the event updates generated by the event server may include a summary of the media associated with the event. The summary may include a computer-generated text summary of one or more of the event video, the event audio, and the event text. In some implementations, the summary of the media associated with the event includes a transcript of the event audio generated by applying speech recognition. In the implementations where the participant has indicated topics of interest, the generated event updates are filtered to retain only the updates that match at least one topic of interest to the event participant. Upon generation of the event updates, processing continues to block 360.

At block 360, the generated event updates are transmitted, by the event server, to the participant device. The transmitted event updates may be presented on a user interface of the participant device in the form of audio, video, text, or combinations thereof. In some implementations, the event updates are transmitted in the form of text messages, e.g., Short Message Service (SMS) messages, chat messages sent via an instant messaging application, messages delivered via an event application, social media messages etc. In some implementations, event updates may include non-text portions, e.g., images from the event.

It will be appreciated that blocks 310-360 can be repeated in whole or in part or may be performed in a different order than shown in FIG. 3. For example, In some implementations, blocks 350 may be performed prior to block 340, such that event updates are generated prior to determining whether the current topic matches a user interest. In some implementations, the generated event updates may be compared directly with the topics of interest of the user, instead of making the determination based on the event media as described above with reference to block 340. In some implementations, event updates may be generated prior to or simultaneous to receiving participant device locations and determining whether the participant device is remote from the event location (blocks 320 and 330). In these implementations, a respective selected subset of the generated event updates may be provided to participants that are determined to be remote from the event location, e.g., based on topics of interest indicated by a respective participant. Generation of event updates in this manner may enable quicker delivery of the update to the participant, e.g., since analysis of the event media is completed prior to or in parallel with determination of whether to provide event updates to particular participants.

Figure 4:
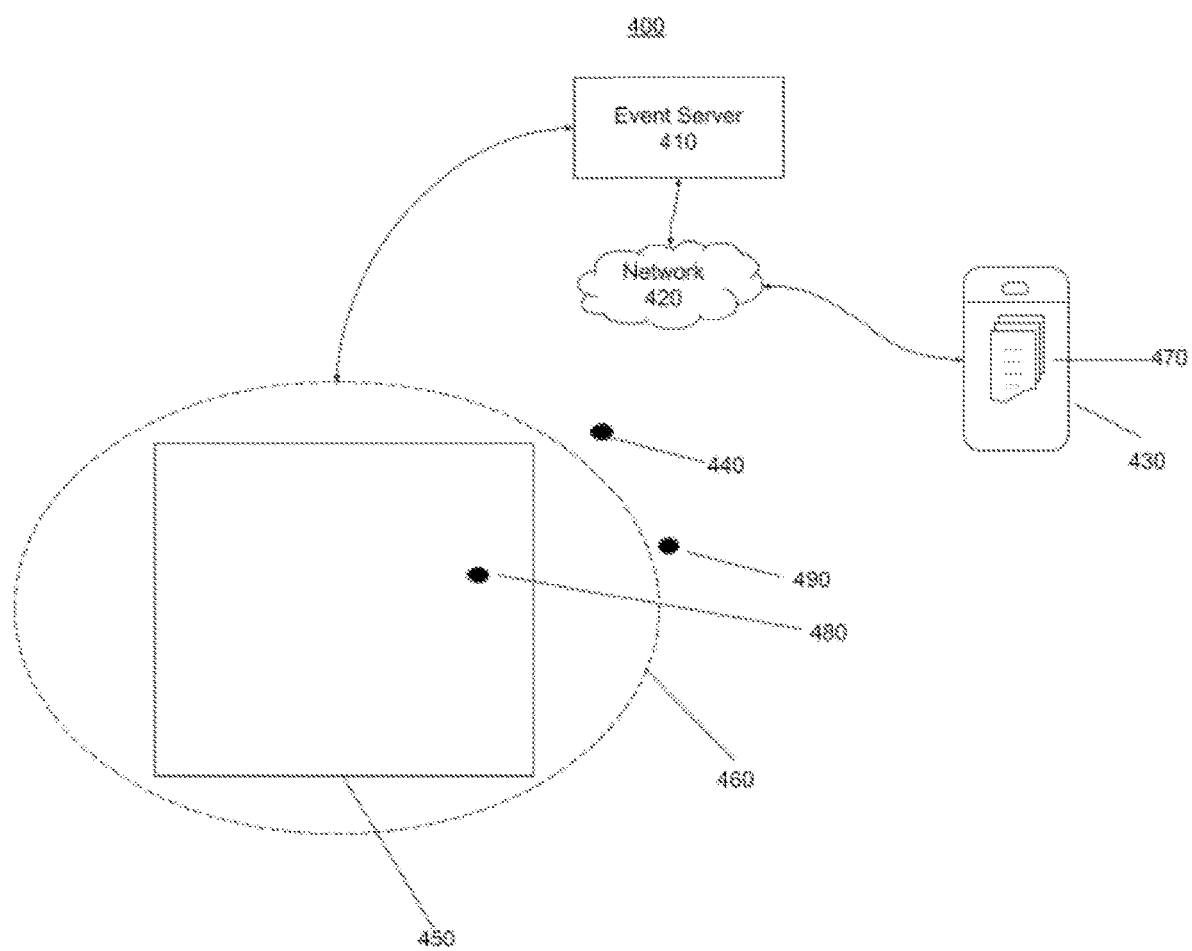
FIG. 4 is an example illustration of delivery of event updates by an event server in accordance with some implementations.

FIG. 4 is an example illustration 400 of delivery of event updates by an event server in accordance with some implementations.

As illustrated in FIG. 4, a participant device 430 and an event server 410 may communicate with each other via a network 420. The participant device 430 may be associated with an event participant who has registered for an event that is associated with a physical event location 450. The event server 410 establishes a geo-fence 460 based on a physical event location 450. The event server 410 may use the geo-fence 460 to compare the location of participant devices to the physical event location 450 during the event, and selectively provide event updates to event participants based on the determined location of the participant devices e.g., provide event updates to event participants who are not physically present at the physical event location 450.

As illustrated in FIG. 4, the event server 410, during the event, receives location 440 of the participant device 430. Based on the participant device location 440, the event server 410 determines that the participant device 430 is outside the geo-fence 460. Therefore, the event server 410 determines that the participant device 430 is distant from the physical event location 450. In other words, the event server 410 determines that event participant (associated with the participant device 430) is not present at the location of the event.

Upon determination that the participant device 430 is distant from the physical event location 450, the event server 410 transmits event updates 470 to the participant device. The event updates 470 may include live event updates i.e., correspond to activity or session that is currently in progress at the event. The event server 410 may also determine topics of interest of the event participant device before transmitting the event updates, and may selectively transmit event updates 470 that correspond to one or more topics of interest of the event participant.

During the event, subsequent to receiving the location 440 of the participant device 430, the event server 410 receives an updated location 480 of the participant device 430. Based on the updated participant device location 480, the event server 410 determines that the participant device 430 is inside the geo-fence 460. Therefore, the event server 410 determines that the participant device 430 is not distant from the physical event location 450. In other words, the event server 410 determines that the event participant (associated with the participant device 430) is present at the location of the event. Upon determination that the participant device 430 is not distant from the physical event location 450, the event server 410 ceases transmission of event updates to the participant device 430. During the event, subsequent to receiving the updated location 480 of the participant device 430, the event server 410 receives a second updated location 490 of the participant device 430. Based on the second updated participant device location 490, the event server 410 determines that the participant device 430 is outside the geo-fence 460. Therefore, the event server 410 determines that the participant device 430 is distant from the physical event location 450. In other words, the event server 410 determines that the event participant associated with the participant device 430 has moved away from the location of the event. Upon determination that the participant device 430 is distant from the physical event location 450, the event server 410 re-initiates transmission of event updates to the participant device 430.

As illustrated in FIG. 4, the event server 410 determines location of the participant device 430 at multiple times during the event, and initiates or ceases transmission of event updates to the participant device 430 as the location of the participant device 430 keeps changing relative to the physical event location 450. Thus, event updates are generated and transmitted only at specific times as needed, thus enabling efficient use of computational resources of the event server 410, e.g., since processing of event media to determine event updates is not performed if there are no remote participants).

It will be appreciated that FIG. 4 illustrates communication between the event server 410 and a participant device 430. However, the event server 410 is configured to determine respective locations of a plurality of participant devices during the event, and the event server 410 may transmit event updates to multiple participant devices simultaneously (e.g., by unicast, or multicast transmission) based on the respective locations of the plurality of participant devices. For example, the event server 410 may determine that another participant device (in addition to participant device 430) is distant from the physical event location, and the event server 410 may transmit the event updates to the participant device 430 and another participant device (not shown in FIG. 4).

Figure 5:
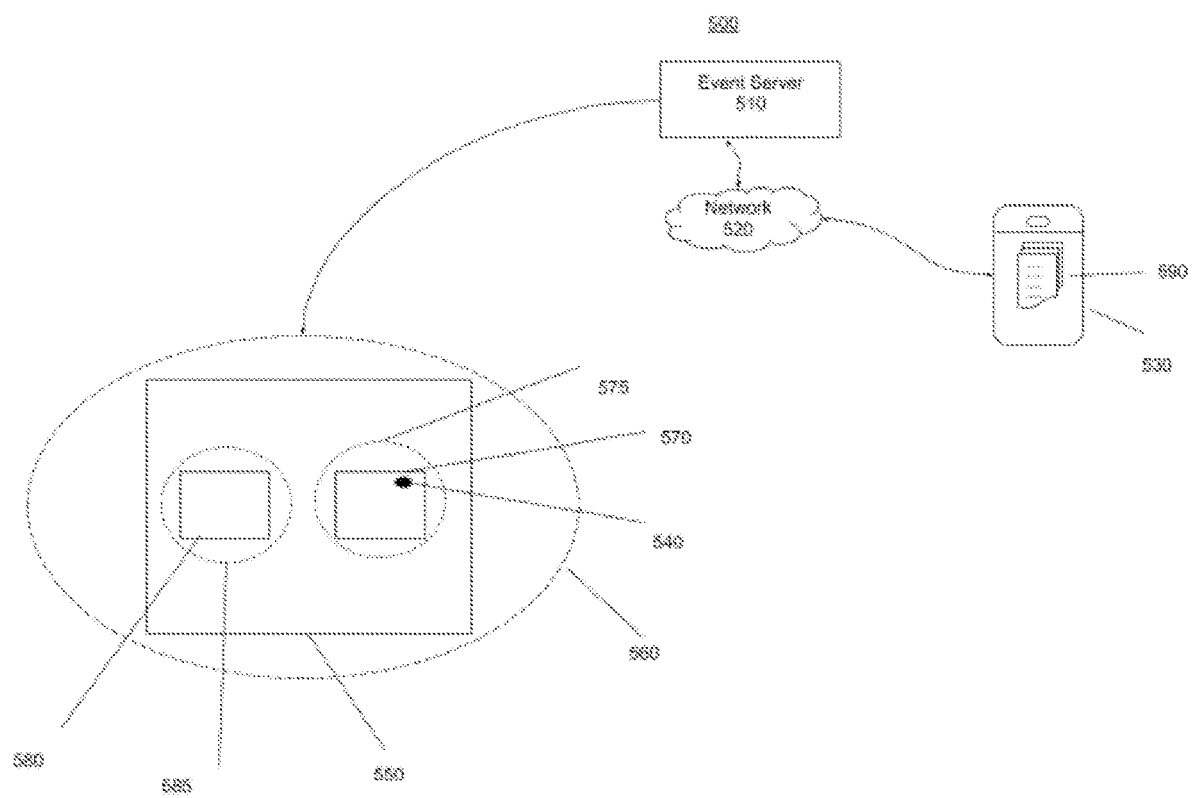
FIG. 5 is an example illustration of delivery of event updates by an event server in accordance with some implementations.

FIG. 5 is an example illustration 500 of delivery of event updates by an event server in accordance with some implementations.

As illustrated in FIG. 5, a participant device 530 and the event server 510 may communicate with each other via a network 520. The participant device 530 may be associated with an event participant who has registered for an event associated with a physical event location 550. The event server 510 establishes a geo-fence 560 based on a physical event location 550. The event server 510 may use the geo-fence 560 to compare the location of participant devices to the physical event location 550 during the event, and selectively provide event updates to event participants based on the determined location of the participant devices e.g., provide event updates to event participants who are not physically present at the physical event location 550.

As illustrated in FIG. 5, the physical event location 550 includes a plurality of sub-event locations, e.g., a sub-event location 570 and a sub-event location 580. The sub-event locations 570 and 580 may represent locations where different sub-events of the event are occurring. Those sub-events may or may not occur simultaneously. For example, the event may be a technical conference about "cloud computing" in which various types of cloud computing solutions are to be presented by various speakers to event participants. For instance, "Speaker A" is scheduled to present "infrastructure as a service" (e.g., first sub-event) in Room A of the event, and "Speaker B" is scheduled to present "software as a service" (e.g., second sub-event) in Room B of the event. Room A may correspond to the sub-event location 570, and Room B may correspond to the sub-event location 580.

The event server 510 establishes geo-fences 575 and 585 around the sub-event locations 570 and 580 respectively. The event server 510 may employ the geo-fences 575 and 585 to compare location of participant devices to the sub-event locations 570 and 580 during the event, and selectively provide event updates to event participants based on the determined location of the participant devices e.g., provide event updates to event participants who are interested in a sub-event occurring at the sub-event locations 570 and/or 580 but are distant from the sub-event locations 570 and/or 580.

As illustrated in FIG. 5, the event server 510, during the event, receives location 540 of the participant device 530. Based on the participant device location 540, the event server 510 determines that the participant device 530 is inside the geo-fence 575. Therefore, the event server 510 determines that the participant device 530 is present at the sub-event location 570. In other words, the event server 410 determines that event participant (associated with the participant device 530) is present at the sub-event location 570 and is attending the sub-event occurring at the sub-event location 570.

The event server 510 may determine that event participant (associated with the participant device 530) is also interested in a sub-event that is also currently in progress at the sub-event location 580. The event server 510 may determine interest of the event participant from the registration information of the event participant.

Upon determination that the event participant (associated with the participant device 530) is also interested in the sub-event that is currently in progress at the sub-event location 580. The event server 510 may provide event updates corresponding to the sub-event taking place at the sub-event location 580, while the event participant is attending the sub-event taking place at the sub-event location 570.

The event server 510 may determine the location of the participant device 530 at multiple times during the event, and initiates or ceases transmission of the event updates to the participant device 430 as the location of the participant device 430 keeps changing relative to the physical event location 550 and/or the sub-event locations 570 and 580. For example, when the event server 510 determines that the participant device 530 to be outside the sub-event location geo-fences 575 and 585, the event server 510 may transmit the location event updates corresponding to both sub-events occurring at sub-events locations 570 and 580. Similarly, when the event server 510 determines that the location of the participant device 530 has changed, and now the participant device 530 is inside the geo-fence 575, the event server 510 ceases transmission of the event updates corresponding to the sub-event occurring at the sub-event location 570, and the event server 510 continues transmission of the event updates corresponding to the sub-event occurring at the sub-event location 580.

Figure 6:
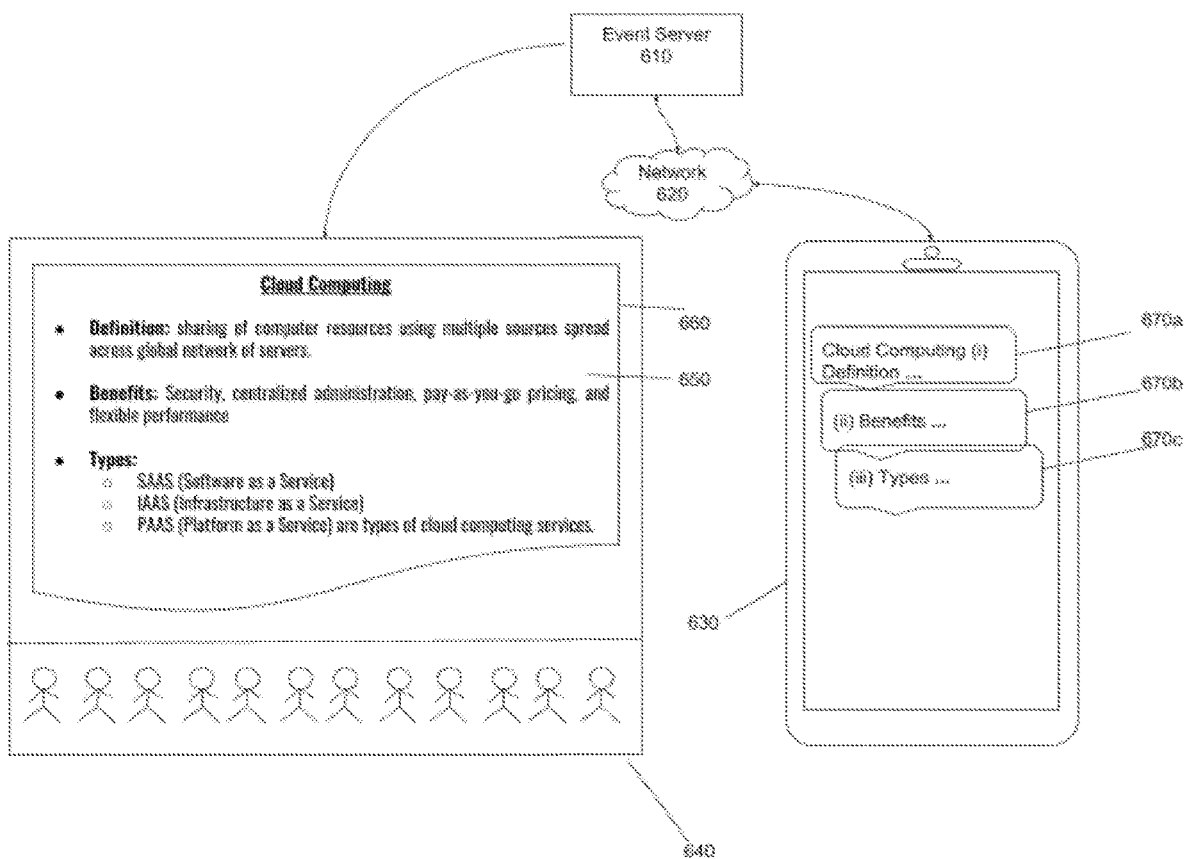
FIG. 6 is an example illustration of delivery of event updates by an event server in accordance with some implementations.

FIG. 6 is an example illustration 600 of delivery of event updates by an event server in accordance with some implementations.

As illustrated in FIG. 6, a participant device 630 and the event server 610 may communicate with each other via a network 620. The participant device 630 may belong to an event participant who has registered for an event 640.

The event server 610 transmits event updates 670a-670c corresponding to event media 650 corresponding to the event 640. The event media 650 corresponds to media being presented on a presentation display 660 to the event participants.

The event server 610 identifies the event media 650 currently being presented in the event 640. For example, the event server 610 may identify the event media 650 from a storage of the event server 610, where the event media 650 may be stored. After identifying the event media 650, the event server 610 analyzes the event media 650 to generate event updates 670a-670c that are transmitted to the participant device 630, via the network 620, in the form of text messages, e.g., Short Message Service (SMS) messages, chat messages sent via an instant messaging application, messages delivered via an event application, etc. In some implementations, event updates may include non-text portions, e.g., images from the event.

The event server 610 may perform operations similar to operations 310-340 (described with reference to FIG. 3) prior to identifying and analyzing the event media 650.

As can be seen in FIG. 6, the event updates 670a-670c transmitted to the participant device 630 include text summary of the event media 650, which is generated by the event server 610 by analyzing and processing the event media 650.

Figure 7:
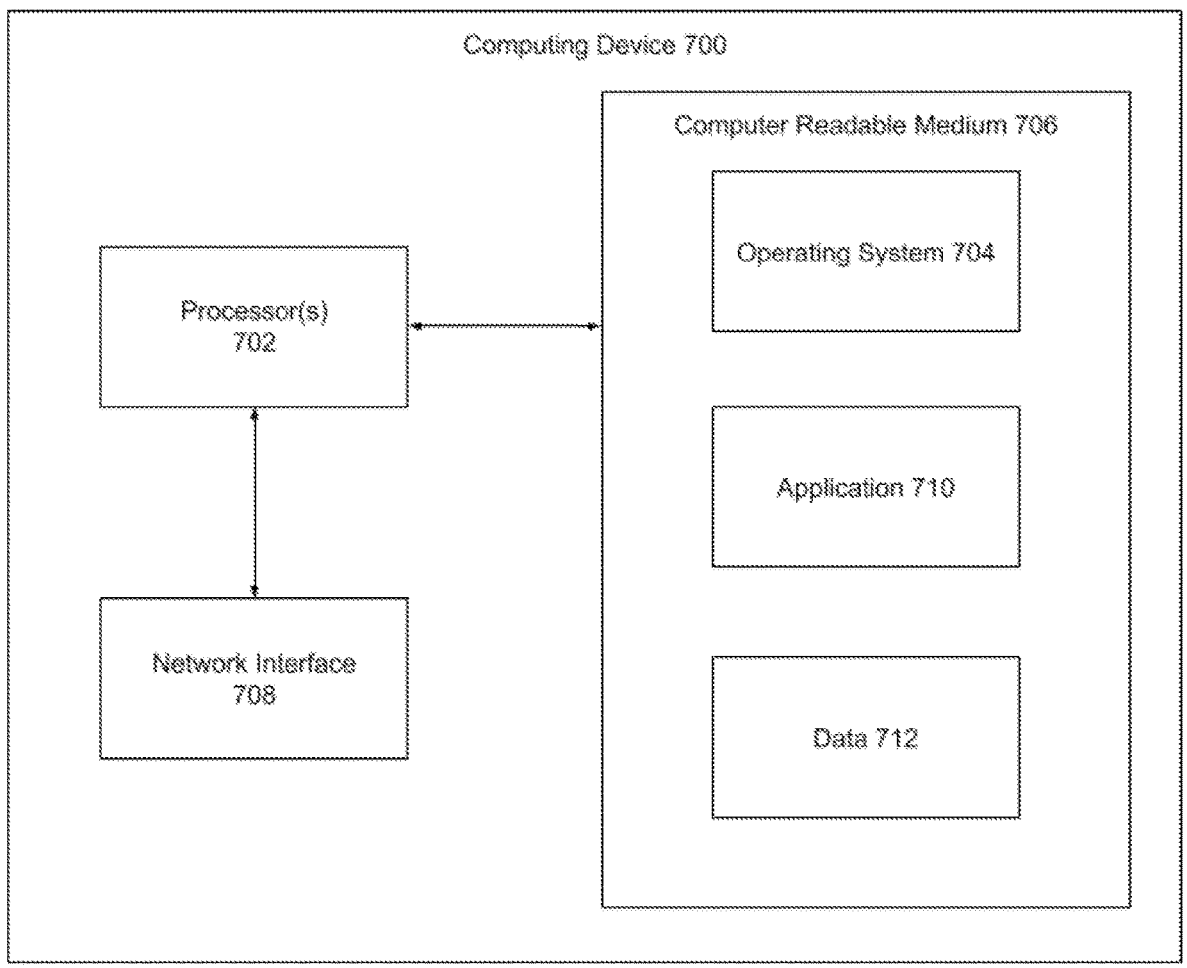
FIG. 7 is a diagram of an example computing device configured for delivery of event updates in accordance with some implementations.

FIG. 7 is a diagram of an example computing device 700 in accordance with at least one implementation. The computing device 700 includes one or more processors 702, a computer readable medium 706 and a network interface 708. The computer readable medium 706 can include an operating system 704, an application 710 for management and control for event updates and a data section 712 (e.g., for storing participants' registration information, participants' location, event updates, etc.).

In operation, the processor 702 may execute the application 710 stored in the computer readable medium 706. Application 710 can include software instructions that, when executed by the processor, cause the processor to perform operations for conference session management and control in accordance with the present disclosure (e.g., performing one or more of the sequences described above in connection with FIGS. 2-6). Application 710 can operate in conjunction with the data section 712 and the operating system 704. Application 710 can implement various modules of event server 200 described with reference to FIG. 2.

It will be appreciated that the modules, processes, systems, and sections described above can be implemented in hardware, hardware programmed by software, software instructions stored on a computer readable medium or a combination of the above. A system as described above, for example, can include a processor configured to execute a sequence of programmed instructions stored on a computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors, or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a computer readable medium).

Furthermore, embodiments of the disclosed method, system, and computer program product (or software instructions stored on a computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for event update management and control.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer-implemented method, comprising:
   receiving, by a server, registration information of an event participant for an event, wherein the registration information includes participant identity information and one or more topics of interest of the event participant, and wherein the event is associated with a physical event location;
   receiving, by the server during the event, a participant device location from a participant device of the event participant;
   comparing, by the server, the participant device location and the physical event location;
   determining, by the server and based on the comparison, that the participant device is distant from the physical event location;
   in response to determining that the participant device is distant from the physical event location, identifying, by the server, media associated with the event;
   analyzing, by the server, the media associated with the event, to determine a current topic of the event;
   determining, by the server, that the current topic matches at least one of the one or more topics of interest of the event participant;
   in response to determining that the current topic matches the at least one of the one or more topics of interest of the event participant, generating, by the server, an event update associated with the event based on the media associated with the event; and
   transmitting, by the server, the event update associated with the event to the participant device.

2. The method of claim 1, further comprising:
   receiving, by the server, during the event and subsequent to receiving the participant device location, an updated participant device location from the participant device of the event participant;
   determining, by the server, that the participant device is at the physical event location based on a comparison of the updated participant device location and the physical event location; and
   in response to determining that the participant device is at the physical event location, ceasing transmission of the event update associated with the event to the participant device.

3. The method of claim 2, wherein the updated participant device location includes a first updated participant device location, and wherein the method further comprises:
   receiving, by the server, during the event and subsequent to receiving the first updated participant device location, a second updated participant device location from the participant device of the event participant;
   determining, by the server, that the participant device is distant from the physical event location based on a comparison of the second updated participant device location and the physical event location; and
   in response to determining that the participant device is distant from the physical event location, re-initiating, by the server, transmission of the event update associated with the event to the participant device.

4. The method of claim 1,
   wherein the media include one or more of: event video, event audio, and event text.

5. The method of claim 4, wherein generating the event update comprises generating a summary of the media associated with the event, and wherein the summary includes a computer-generated text summary of one or more of: the event video, the event audio, and the event text.

6. The method of claim 5, wherein generating the summary of the media associated with the event comprises generating a transcript of the event audio by applying speech recognition, and wherein transmitting the event update associated with the event comprises transmitting the transcript of the event audio to the participant device.

7. The method of claim 1, wherein comparing the participant device location and the physical event location comprises:
   establishing a geo-fence based on the physical event location;
   determining, based on the participant device location, whether the participant device is inside the geo-fence; and
   in response to determining that the participant device is outside the geo-fence, determining that the participant device is distant from the physical event location.

8. The method of claim 1, wherein:
   the physical event location includes a plurality of sub-event locations that correspond to a plurality of sub-events within the event,
   comparing the participant device location and the physical event location comprises determining that the participant device is at a first sub-event location of the plurality of sub-event locations, and
   transmitting the event update associated with the event to the participant device comprises transmitting an event update that corresponds to a sub-event that is occurring at a second sub-event location while the participant device is at the first sub-event location.

9. The method of claim 1, wherein the event is a virtual event, and wherein the physical event location associated with the event is a particular location that the event participant provides in the registration information when registering for the event.

10. The method of claim 1, further comprising:
   detecting, by the server, that a second participant device is distant from the physical event location; and
   transmitting, by the server via multicast transmission, the event update associated with the event to the second participant device.

11. The method of claim 1, wherein the event update comprises a query, and wherein the method further comprises: receiving, at the server, a response to the query from the participant device.

12. A system, comprising:
   a microprocessor; and
   a computer readable storage medium coupled with the microprocessor and comprising microprocessor readable and executable instructions that cause the microprocessor to perform operations including:
   receiving registration information of an event participant for an event, wherein the registration information includes participant identity information and one or more topics of interest of the event participant, and wherein the event is associated with a physical event location;
   receiving, during the event, a participant device location from a participant device of the event participant;
   determining, that the participant device is distant from the physical event location based on comparing the participant device location and the physical event location;
   in response to determining that the participant device is distant from the physical event location, identifying media associated with the event;
   analyzing the media associated with the event, to determine a current topic of the event;
   determining that the current topic matches at least one of the one or more topics of interest of the event participant;
   in response to determining that the current topic matches the at least one of the one or more topics of interest of the event participant, generating an event update associated with the event based on the media associated with the event; and
   transmitting, based on the comparison, the event update associated with the event to the participant device.

13. The system of claim 12, wherein:
   the physical event location includes a plurality of sub-event locations that correspond to a plurality of sub-events within the event,
   the registration information includes information about at least one sub-event, of the plurality of sub-events, which is of interest to the event participant, and
   comparing the participant device location and the physical event location comprises determining that the participant device is distant from a sub-event location that corresponds to the at least one sub-event.

14. The system of claim 13, wherein transmitting the event update associated with the event comprises transmitting an event update associated with the at least one sub-event to the participant device in response to determining that the participant device is distant from the sub-event location.

15. The system of claim 14, wherein the at least one sub-event is a first sub-event, and wherein the at least one sub-event is occurring at a first sub-event location, the operations further comprising:
   receiving, during the event and subsequent to receiving the participant device location, an updated participant device location from the participant device of the event participant;
   determining that the participant device is at the first sub-event location based on a comparison of the updated participant device location and the first sub-event location;
   in response to determining that the participant device is at the first sub-event location, ceasing transmission of the event update associated with the first sub-event to the participant device;
   determining, based on the registration information, that the event participant is also interested in a second sub-event that is occurring at a second sub-event location while the participant device is at the first sub-event location; and
   in response to determining that the event participant is interested in the second sub-event that is occurring at the second sub-event location while the participant device is at the first sub-event location, transmitting an event update associated with the second sub-event to the participant device.

16. The system of claim 12, wherein transmitting the event update associated with the event comprises transmitting, to the participant device, one or more text messages, one or more instant chat messages, one or more social media messages, or one or more messages in an event application installed on the participant device, or combinations thereof.

17. A participant device, comprising:
   a microprocessor; and
   a computer readable storage medium coupled with the microprocessor and comprising microprocessor readable and executable instructions that cause the microprocessor to perform operations including:
   transmitting, to a server, registration information of an event participant for an event, wherein the registration information includes participant identity information and one or more topics of interest of the event participant, and wherein the event is associated with a physical event location;
   transmitting, to the server, during the event, a participant device location;
   establishing a media channel between the participant device and the server; and
   receiving, from the server, via the media channel, and based on the participant device location, an event update associated with the event, wherein the event update is generated substantially simultaneous to occurrence of the event, wherein the event update is related to the one or more topics of interest of the event participant, and wherein the event update is transmitted by the server in response to:
   comparison of the participant device location and the physical event location;
   determination, based on the comparison, that the participant device location is distant from the physical event location;
   in response to the determination that the participant device is distant from the physical event location, identification of media associated with the event;
   analysis of the media associated with the event to determine a current topic of the event;
   determination that the current topic of the event matches at least one of the one or more topics of interest of the event participant; and
   in response to the determination that the current topic matches the at least one of the one or more topics of interest of the event participant, generation of the event update associated with the event based on the media associated with the event.

18. The participant device of claim 17, wherein receiving the event update comprises receiving one or more text messages, one or more chat messages sent via an instant messaging application, one or more social media messages, or one or more messages in an event application installed on the participant device, or combinations thereof.

19. The participant device of claim 17, wherein receiving the event update comprises receiving a summary of media associated with the event, and wherein the summary includes a computer-generated text summary of one or more of: an event video, an event audio, and an event text.

* * * * *